Oct. 24, 1944.  O. H. PADDOCK  2,361,050
OPTICAL INSTRUMENT
Filed July 14, 1942  2 Sheets-Sheet 2
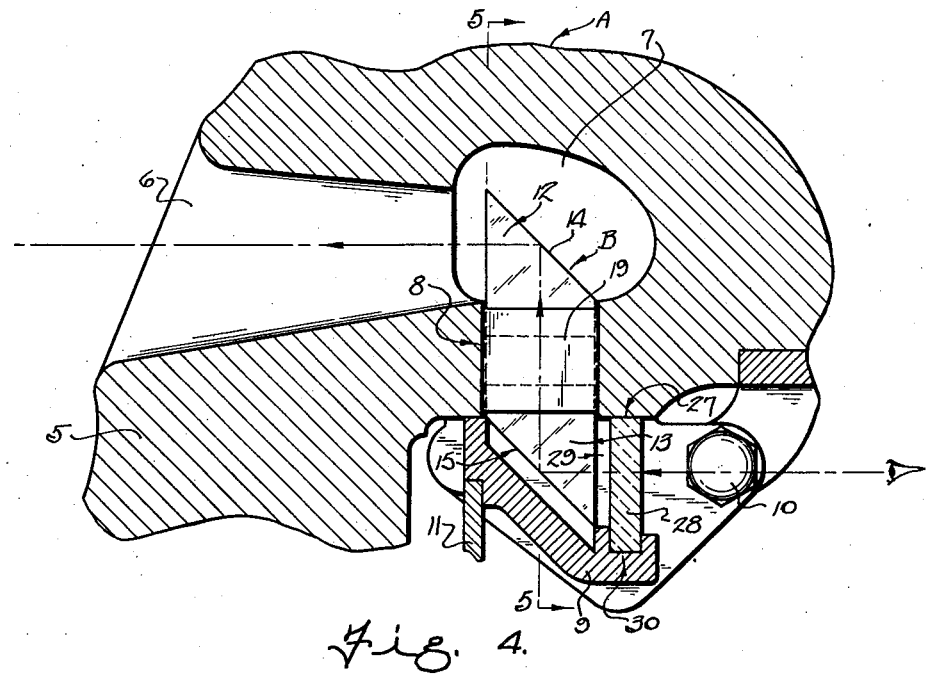
Fig. 4.
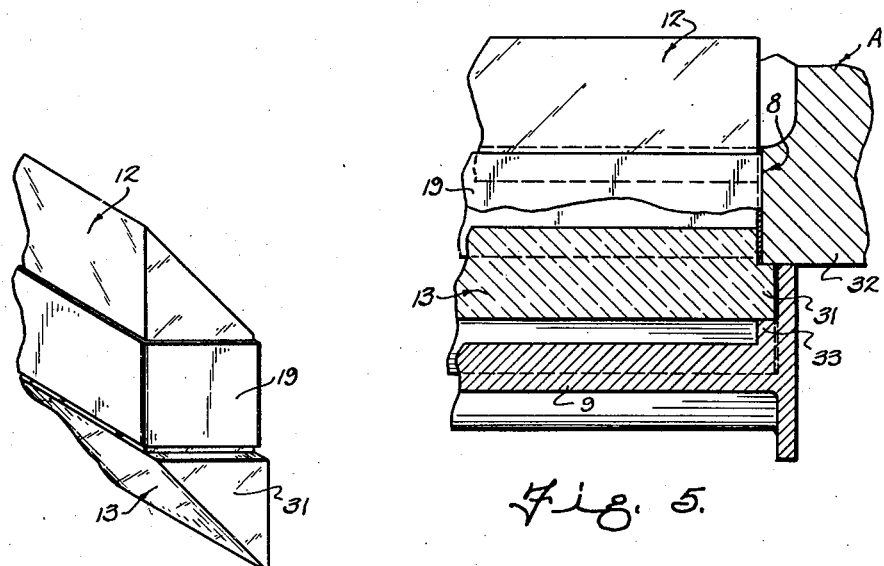
Fig. 6.
Fig. 5.
Inventor
ORMOND H. PADDOCK.
By Frank Fraser
Attorney Patented Oct. 24, 1944

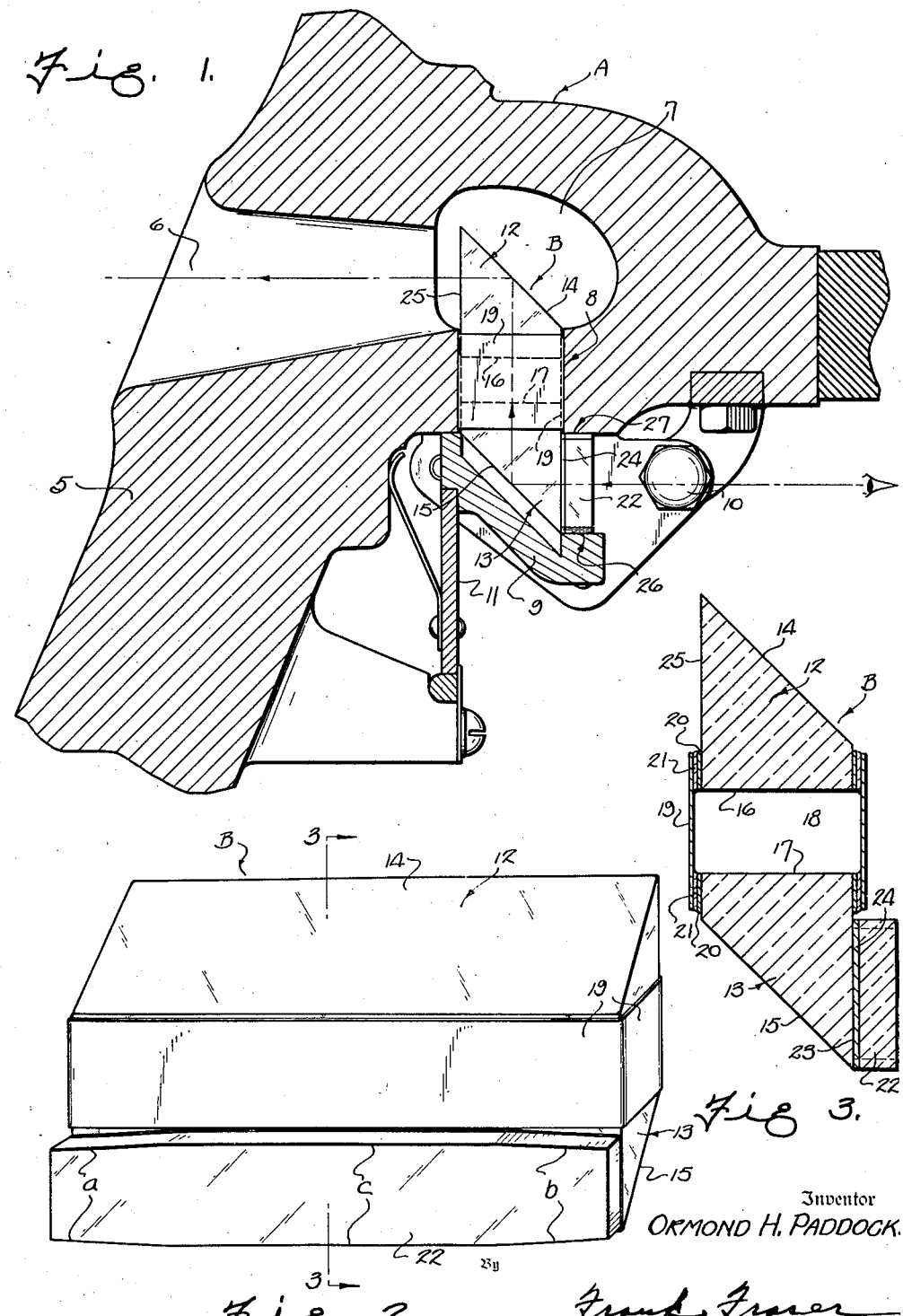

2,361,050

UNITED STATES PATENT OFFICE 2,361,050

OPTICAL INSTRUMENT

Ormond H. Paddock, Rossford, Ohio, assignor to Libbey-Owens-Ford Glass Company, Toledo, Ohio, a corporation of Ohio Application July 14, 1942, Serial No. 450,848

8 Claims. (Cl. 88—69)

The present invention relates broadly to optical instruments and more particularly to improvements in periscopes.

As is well known, periscopes are used to enable an observer to obtain a field of view which would be otherwise impossible to get because of an intervening obstacle or the like. A periscope ordinarily comprises a tube containing an optical system with reflecting surfaces at opposite ends, usually mirrors, inclined at an angle of 45° to the axis of the tube so that an observer looking into one mirror, generally through an eye-piece, can see the objects reflected by the other mirror. While the periscope of this invention may be used wherever it is desired to obtain indirect vision, it is particularly adapted for use in mobile land vehicles, such as tanks. It is adapted to be mounted in proximity to an observer so that he will be able to observe the desired area or field in a rapid, convenient manner, without the necessity of adjustment or focusing of the instrument and without exposing himself to injury in combat service.

An object of the invention is to provide a front vision periscope embodying a system of object reflecting glass prisms so designed and associated with one another as to give a properly oriented image both as to top and bottom and from right to left, whereby the observer will immediately know without calculation the location of any obstruction ahead of the tank or the disposition of enemy tanks, troops, etc.

Another object of the invention is the provision of a front vision periscope of the above character in which substantially the entire reflecting surfaces of the glass prisms are utilized to obtain a maximum field of view and being so constructed as to produce a sharply defined image of high brilliancy and clarity, substantially free from distortion.

A further object of the invention is the provision of a front vision periscope of the above character capable of withstanding the necessary shocks, vibration, etc., to which it will be subjected in normal use; and being further characterized by the provision of means serving to cushion or absorb the force of any direct impact upon the upper end thereof, such as when it suffers a direct hit from outside the tank, whereby complete shattering of the instrument and scattering of the glass within the tank is prevented so that greater protection is afforded the occupants thereof.

Other objects and advantages of the invention will become more apparent during the course of the following description, when taken in connection with the accompanying drawings.

In the drawings, wherein like numerals are employed to designate like parts throughout the same:

Fig. 1 is a transverse section through a portion of a tank in which is mounted a periscope provided by the invention;

Fig. 2 is a perspective view of the periscope;

Fig. 3 is a vertical transverse section therethrough taken substantially on line 3—3 of Fig. 2;

Fig. 4 is a view similar to Fig. 1 but showing a modified type of periscope;

Fig. 5 is a vertical section taken substantially on line 5—5 of Fig. 4; and

Fig. 6 is a perspective view of a portion of the periscope of Figs. 4 and 5.

With reference first to Figs. 1 to 3, there is illustrated diagrammatically in Fig. 1 a portion of a tank A in which is mounted the periscope B provided by the invention. It will of course be understood that this is illustrative of only one application of the invention and that it may be used in any mobile land vehicle and, in fact, at any place where it is desired to obtain an indirect field of view which it would be otherwise impossible to get. The portion of the tank shown comprises an outer wall 5 having a horizontal observation port 6 therethrough leading into a chamber 7 which communicates with the interior of the tank through a vertical opening 8. The periscope B is mounted in the vertical opening 8 and supported at its lower end upon a hinged member 9 pivoted as at 10 and held in closed position by a catch 11.

The periscope B includes an optical system comprising the two substantially trapezoidal prisms 12 and 13 having reflecting surfaces 14 and 15 respectively which are substantially parallel with one another and inclined at an angle of 45° to the axis of the rays of light reflected from said prisms. The prisms 12 and 13 are preferably of tempered glass and are arranged in spaced relation, with the inner adjacent base surfaces 16 and 17 thereof parallel with one another to form an air chamber 18 therebetween. The two prisms are also secured together in properly spaced relation by a metal band or collar 19, preferably consisting of a strip of brass or other suitable metal which is wrapped around the base portions of the prisms and secured thereto in such a way as to heremetically seal the air chamber 18.

Although the invention is not limited to any specific method of securing the two prisms 12 and 13 together, a preferred method which has been satisfactorily employed consists in first applying to the marginal portions of each prism, adjacent the base 16 or 17 thereof, a metallic coating 20 of copper, a copper alloy, or any other suitable solderable metal or metal alloy. The metallic coating 20 is preferably formed by spraying a molten metal upon the glass surfaces, although it may be applied in any other suitable manner. The metallic coatings 20 are then suitably tinned with a layer of solder as is also one surface of the metal band 19. The metal band 19 is then wrapped around the prisms, while they are held in predetermined spaced relation, with the tinned surface of the metal band in contact with the tinned metallic coatings 20. The metal band is then secured to the prisms by a so-called sweating operation in which the contacting layers of solder on the metallic coatings 20 and metal band 19 are subjected to sufficient heat to cause them to amalgamate and fuse to one another as indicated at 21 to hermetically seal the space 18 between the prisms 12 and 13. This may be accomplished either with the use of an ordinary soldering iron, in a platen press, or according to any other suitable method of heat application.

Carried by the lower prism 13 is an eye-piece 22, in the form of a substantially rectangular plate of glass which is secured to the front face 23 of the prism by an interposed layer of plastic material 24. The plastic interlayer 24 is preferably formed of a synthetic resin such as a polyvinyl acetal resin, although the invention is not limited to the use of any particular resin, class of resins, cellulosic derivatives or the like. The eye-piece 22 may be adhered to the prism 13 by any well known method of making laminated safety glass. By securing the eye-piece 22 to the prism 13, the light transmission through the instrument is increased.

The periscope B is mounted in the vertical opening 8 of the tank so that the upper prism 12 is received within the chamber 7, with the front face 25 thereof facing in the direction of and being in line with the observation port 6. The lower prism 13 is received within the interior of the tank, with the eye-piece 22 so located as to permit convenient observation. The periscope may be held in place in any suitable manner, such as by clamping the eye-piece 22 between the the shoulder 26 of hinged member 9 and the opposing surface 27 of the tank wall.

In practice, an occupant of the tank looking into the eye-piece 22 can readily observe the field or area in front of the tank rapidly and conveniently and without any calculations, adjustments or focusing of the periscope. The objects in the line of sight of the periscope will first pass through prism 12 and be reflected in the reflecting surface 14 thereof. The objects reflected in prism 12 will then be reflected downwardly through prism 13 to the reflecting surface 15 thereof from which they will be reflected horizontally upon the eye-piece 22. The arrows in Fig. 1 illustrate the line of vision from the eye of an observer within the tank through the periscope and indicate the manner of observing conditions in front of the tank.

It has been found that the periscope of this invention produces a sharply defined image of high brilliancy and clarity substantially free from distortion. Further, substantially the entire reflecting surfaces 14 and 15 of the prisms 12 and 13 respectively are utilized. Under certain conditions, it may be desirable that the reflecting surfaces 14 and 15 of the prisms be provided with a reflective coating of aluminum, silver or the like.

The employment of the two spaced prisms 12 and 13, as provided by the present invention, is of decided advantage over the use of a single solid prism. For instance, when using a single solid prism of untempered glass, the shock of impact of a near hit is sufficient to cause prism fracture, whereas, if the solid prism is of tempered glass, the explosive fracture from a direct hit is sufficient to scatter broken glass particles into the tank.

By employing two spaced prisms with the sealed air space or chamber 18 therebetween, there is provided an air cushion which serves to absorb the shock of any direct impact against the upper prism 12, such as when it is subjected to a direct hit from outside the tank. It has been found that when the upper prism is subjected to a direct hit, the prism itself may be shattered and the force of the impact may drive the prism downwardly within the opening 8, causing a buckling or rupture of the metal collar 19. However, it has been demonstrated that because of the air cushion between the prisms the lower prism 13 is either not shattered or is not shattered with sufficient force to cause the scattering of glass particles throughout the tank. This affords greatly increased protection to the occupants of the tank and especially to an observer who may be looking through the periscope at the moment of direct impact. The metal collar 19 is of the necessary thickness to give the required rigidity to the instrument so that it will withstand ordinary usage and, at the same time, sufficiently thin to give under impact so that the shock of a direct hit upon the upper prism is not transmitted directly to the lower prism.

Another advantage in hermetically sealing the air chamber 18 between the two prisms 12 and 13 is that the clarity of vision is not impaired by dust, dirt, moisture, etc., which might otherwise collect upon the base surfaces 16 and 17 of the prisms.

A further feature of the invention is in the novel shape of the eye-piece 22 which minimizes the liability of cracking or breaking thereof upon being subjected to shocks, vibration, etc. As shown in Fig. 2, the eye-piece 22 consists of a substantially rectangular glass plate which is slightly tapered at its opposite ends as indicated at *a* and *b*. With such a construction, when the periscope is mounted in place, the relatively long, flat, intermediate edge portions *c* of the eye-piece engage the shoulder 26 of hinged member 9 and opposed tank surface 27, whereas the tapered corner portions *a* and *b* of the eye-piece are spaced slightly therefrom. In this way, the corners of the eye-piece will be maintained out of contact with the tank surfaces so that the danger of them becoming cracked or broken from shocks and vibration is greatly lessened.

Although the eye-piece 22 has been described hereinabove as being secured to the lower prism 13, the eye-piece may be separately mounted, if desired, at a slight loss in visible transmission but with an increased safety factor in the event of shattering of the entire prism assembly by a direct hit. Such a construction is illustrated in Figs. 4, 5 and 6, wherein the eye-piece 28 is mounted slightly forwardly of the lower prism 13 to provide a relatively narrow air space 29 therebetween. The eye-piece is clamped between the pivoted member 9 and opposing surface 27 of the tank wall, with the lower edge of said eye-piece received within a channel 30 in said pivoted member 9.

When a separately mounted eye-piece is employed, other means must be provided for supporting the periscope B within the opening 8 in the tank. Although this may be accomplished in vaious ways, the lower prism 13 is here shown as being provided at each end with an extension 31 projecting beyond the metal collar 9 and upper prism 12. When installing the periscope, it is shoved upwardly through the opening 8 in the tank until the upper edges of the extensions 31 on lower prism 13 engage the bottoms of the side walls 32 of the opening 8 as shown in Fig. 5. The supporting member 9 is then swung closed, whereupon the ribs 33 at the opposite ends thereof engage the inclined reflecting surface 15 of the prism extensions 31 to maintain the periscope in place.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. In an optical instrument of the character described, upper and lower glass prisms, each having an object reflecting surface, said prisms being arranged in spaced relation, with the reflecting surfaces thereof parallel to one another, and a deformable metal collar around said prisms and secured thereto for normally maintaining them in predetermined spaced relation but which will yield on severe impact to prevent the transmission of shock from one prism to the other.

2. In an optical instrument of the character described, upper and lower glass prisms, each having an object reflecting surface, said prisms being arranged in spaced relation, with the reflecting surfaces thereof parallel to one another, a deformable metal collar around said prisms and secured thereto for normally maintaining them in predetermined spaced relation but which will yield on severe impact to prevent the transmission of shock from one prism to the other, and a glass eye-piece bonded to the lower prism by an interposed layer of plastic material.

3. In an optical instrument of the character described, upper and lower glass prisms, each having a substantially flat base and an object reflecting surface disposed at approximately a 45° angle thereto, said prisms being arranged with the bases thereof in spaced parallel relation, and a deformable metal collar around said prisms and soldered thereto for securing said prisms together and normally maintaining them in predetermined spaced relation but which will yield on severe impact to prevent the transmission of shock from one prism to the other.

4. In an optical instrument of the character described, upper and lower glass prisms, each having a substantially flat base and an object reflecting surface disposed at approximately a 45° angle thereto, said prisms being arranged with the bases thereof in spaced parallel relation, a deformable metal collar around said prisms and soldered thereto for securing said prisms together and normally maintaining them in predetermined spaced relation but which will yield on severe impact to prevent the transmission of shock from one prism to the other, and an eye-piece bonded to the lower prism by an interposed layer of plastic material.

5. In an optical instrument of the character described, upper and lower glass prisms, each having a substantially flat base and an object reflecting surface disposed at approximately a 45° angle thereto, said prisms being arranged with the bases thereof in spaced parallel relation, a deformable metal collar around said prisms and soldered thereto for securing said prisms together and normally maintaining them in predetermined spaced relation but which will yield on severe impact to prevent the transmission of shock from one prism to the other, and an eye-piece bonded to the lower prism by an interposed layer of plastic material, said eye-piece comprising a substantially rectangular glass plate having the opposite end portions thereof tapered.

6. In an optical instrument of the character described, upper and lower glass prisms, and deformable means securing said prisms in predetermined spaced relation and hermetically sealing the space therebetween to provide an enclosed air space which serves to cushion or absorb the shock of an impact upon the upper prism and prevents the shock of such impact from being transmitted directly to the lower prism.

7. In an optical instrument of the character described, upper and lower glass prisms, and deformable metallic means securing said prisms in predetermined spaced relation and hermetically sealing the space therebetween to provide an enclosed air space which serves to cushion or absorb the shock of an impact upon the upper prism and prevents the shock of such impact from being transmitted directly to the lower prism.

8. In an optical instrument of the character described, upper and lower glass prisms, and a deformable metal collar soldered to said prisms securing them in predetermined spaced relation and hermetically sealing the space therebetween to provide an air space which serves to cushion or absorb the shock of an impact upon the upper prism and prevents the shock of such impact from being transmitted directly to the lower prism.

ORMOND H. PADDOCK.